(12) United States Patent
Carey et al.

(10) Patent No.: US 7,925,405 B2
(45) Date of Patent: Apr. 12, 2011

(54) TORQUE DISTRIBUTION SYSTEM WITH ELECTRONIC POWER TAKE-OFF MODULE

(75) Inventors: Clinton E. Carey, Monroe, MI (US); Craig S. Ross, Ypsilanti, MI (US); Edmund F. Gaffney, White Lake, MI (US); Todd C. Schanz, Willis, MI (US); Kenneth K. Lang, Saline, MI (US); Paul A. Grougan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 934 days.

(21) Appl. No.: 11/771,373

(22) Filed: Jun. 29, 2007

(65) Prior Publication Data

US 2008/0046158 A1 Feb. 21, 2008

Related U.S. Application Data

(60) Provisional application No. 60/822,989, filed on Aug. 21, 2006.

(51) Int. Cl.
*F16H 48/12* (2006.01)
*B60K 17/35* (2006.01)
*G06F 19/00* (2006.01)

(52) U.S. Cl. ............... 701/51; 701/69; 701/89; 477/176

(58) Field of Classification Search .................. 701/51, 701/69, 84, 87, 89; 477/176
See application file for complete search history.

(56) References Cited

U.S. PATENT DOCUMENTS

| | | | | |
|---|---|---|---|---|
| 5,418,725 A | | 5/1995 | Eto | |
| 5,611,407 A | * | 3/1997 | Maehara et al. | 180/249 |
| 5,674,155 A | * | 10/1997 | Otto et al. | 477/176 |
| 5,947,224 A | * | 9/1999 | Kouno | 180/248 |
| 6,116,391 A | * | 9/2000 | Kremmling et al. | 192/3.58 |
| 6,209,673 B1 | | 4/2001 | Barlage et al. | |
| 6,453,763 B2 | * | 9/2002 | Tanizawa et al. | 74/335 |
| 6,523,435 B2 | | 2/2003 | Ruehle et al. | |
| 6,733,411 B1 | | 5/2004 | Kaplan et al. | |
| 7,048,084 B2 | * | 5/2006 | Shigeta et al. | 180/248 |
| 7,150,694 B2 | * | 12/2006 | Mizon et al. | 475/206 |
| 7,210,376 B2 | * | 5/2007 | Davidsson | 74/650 |

FOREIGN PATENT DOCUMENTS

| | | |
|---|---|---|
| CN | 2065696 U | 11/1990 |
| CN | 1168840 A | 12/1997 |
| CN | 1355875 A | 6/2002 |
| JP | 2286432 A | 11/1990 |
| JP | 7280080 A | 10/1995 |
| JP | 9071142 A | 3/1997 |

\* cited by examiner

*Primary Examiner* — Tan Q Nguyen

(74) *Attorney, Agent, or Firm* — Quinn Law Group, PLLC

(57) ABSTRACT

A torque distribution system for a vehicle permits the transfer of torque between vehicle wheels using a selectively engagable clutch that is hydraulically engaged using hydraulic pressure provided by a hydraulic transmission pump driven by the engine, allowing for enhanced system functionality and reduced part content in comparison with known torque distribution systems. The system may include an "active-on-demand" clutch that is selectively engagable to transfer torque between a front differential and a rear differential (thereby transferring torque from the front wheels to the rear wheels) as well as an electronically-limited slip differential clutch selectively engagable to transfer torque from one front wheel to the other front wheel through the front differential. Utilization of the transmission hydraulic pump allows pressure to be provided to engage the clutch even when the wheels are stationary, i.e., to launch the vehicle.

13 Claims, 5 Drawing Sheets

TORQUE DISTRIBUTION SYSTEM WITH ELECTRONIC POWER TAKE-OFF MODULE

CROSS REFERENCE TO RELATED APPLICATIONS

This application claims the benefit of U.S. Provisional Application No. 60/822,989, filed Aug. 21, 2006, which is hereby incorporated by reference in its entirety.

TECHNICAL FIELD

The invention relates to a system for distributing driving torque between vehicle wheels and includes an electronic power take-off unit for same.

BACKGROUND OF THE INVENTION

The ability to control torque distribution among the wheels of a vehicle improves vehicle traction. Torque distribution systems, also referred to as torque biasing systems, include limited slip differentials having a clutch that is engagable to transfer torque between left and rights wheels and active-on-demand systems, also utilizing a selectively engagable clutch, to transfer torque between front and rear wheels. Existing torque distribution systems typically require the addition of an electric motor-driven pump for actuation of the clutch, thus increasing required componentry. Alternative existing systems may engage the clutches using a pump that is actuated by a speed difference between wheels, thus requiring that the vehicle be in motion for the system to operate.

SUMMARY OF THE INVENTION

A torque distribution system for a vehicle permits the transfer of torque between vehicle wheels using a selectively engagable clutch that is hydraulically engaged using hydraulic pressure provided by an engine-driven pump, allowing for enhanced system functionality and reduced part content in comparison with known torque distribution systems. The system includes at least one torque-transmitting mechanism, such as an "active-on-demand" clutch that is selectively engagable to transfer torque between a front differential and a rear differential (thereby transferring torque from the front wheels to the rear wheels) and/or an electronically-limited slip differential clutch selectively engagable to transfer torque from one front wheel to the other front wheel through the front differential. Utilization of the transmission hydraulic pump, typically present in a transmission for providing lubrication and cooling to transmission gears and gear selection clutches, allows pressure to be provided to engage the clutch even when the wheels are stationary, i.e., to launch the vehicle. This is not possible with limited slip differential clutches that are actuated by hydraulic pressure provided by a pump that is driven by a speed difference between two of the wheels to generate hydraulic pressure to actuate the clutch. Braking of the vehicle is also not required in order to engage either the electronically-limited slip differential clutch or the active-on-demand clutch. Additionally, cost, weight, and packaging space savings and reduced electrical power consumption may be realized with respect to systems requiring a separate motor and pump to provide hydraulic pressure for clutch engagement.

Preferably, the clutch or clutches of the torque distribution system are packaged as a module, referred to herein as an electronically-controlled power take-off module, having its own casing mountable adjacent the transmission casing with a fluid connection there between to allow the transmission pump to connect with the clutches. An electronic controller may be used to control engagement of the clutches based on vehicle operating information such as wheel speed, yaw rate, steering angle, and lateral acceleration. The controller may also modulate the amount of hydraulic pressure provided to the clutches to allow slipping engagement, with associated reduced torque transfer, when desired.

Specifically, a torque distribution system for a vehicle having wheels and a hydraulic pump includes at least one torque-transmitting mechanism selectively engagable to transfer torque between at least two of the wheels. The hydraulic pump is hydraulically connectable with the torque-transmitting mechanism(s) for controlling engagement thereof. The hydraulic pump is driven by the engine and so can provide hydraulic pressure regardless of wheel speed. Preferably, the hydraulic pump also provides lubrication and hydraulic pressure to the transmission.

The torque distribution system may utilize a first or front differential mechanism having a first member operatively connected for driving rotation by an output member of the transmission, a second member operatively connected for driving rotation of the left front wheel and a third member operatively connected for driving rotation of the right front wheel. The torque-transmitting mechanism may be a first friction clutch that is selectively engagable to transfer torque between the second and third members, thereby transferring torque between the left and right front wheels.

Additionally, a longitudinally-extending member such as a propeller shaft spans at least partially between the front wheels and rear wheels. A rear differential mechanism operatively connects the rear wheels with the longitudinally-extending member. The torque-transmitting mechanism may be a clutch that is selectively engagable for transferring torque between the front differential and the longitudinally-extending member to thereby transfer torque between the front and rear wheels.

The torque distribution system may include an electronic controller that receives a sensor signal correlated with at least one vehicle condition and then sends a control signal based on the sensor signal and determinative of hydraulic pressure applied to the torque-transmitting mechanism(s), thereby permitting controlled slip to vary the amount of torque transferred by the torque-transmitting mechanism(s).

The torque distribution system may include a hydraulic control module which operatively connects the electronic controller with the torque-transmitting mechanism of the torque distribution system. The hydraulic control module includes a first solenoid selectively actuatable by a control signal from the controller to allow hydraulic pressure provided by the pump into fluid communication with the torque-transmitting mechanism. Preferably, an accumulator and an additional solenoid are provided. The additional solenoid is in fluid communication between the accumulator and the first solenoid and is selectively actuatable and configured to permit hydraulic flow to the first solenoid when actuated and prevent hydraulic flow to the first solenoid, maintaining hydraulic pressure in the accumulator, when not actuated. A check valve or a second additional solenoid may be positioned between the hydraulic pump and the accumulator to control fluid flow between the hydraulic pump and the accumulator. Preferably, pressure sensors are operatively connected to each of the torque-transmitting mechanisms to monitor apply pressure of the torque-transmitting mechanisms and communicate the monitored pressure to the controller, thereby allowing feedback control of clutch apply torque.

The torque-transmitting mechanisms, e.g., the active-on-demand clutch, the electronically-limited slip differential clutch, and the electronic controller of the torque distribution system, may be referred to as an electronically-controlled power take-off module. The torque-transmitting mechanisms may be packaged in a module casing that encloses the torque-transmitting mechanisms and is connectable to a transmission casing for the transmission to permit fluid transfer from the transmission pump to the torque-transmitting mechanisms through the connected transmission casing and module casing. The different combinations of electronically-controlled solenoid(s), accumulator, ball check valve, and pressure sensor(es) discussed herein, may be referred to as a hydraulic control module that is part of the electronically-controlled power take-off module The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
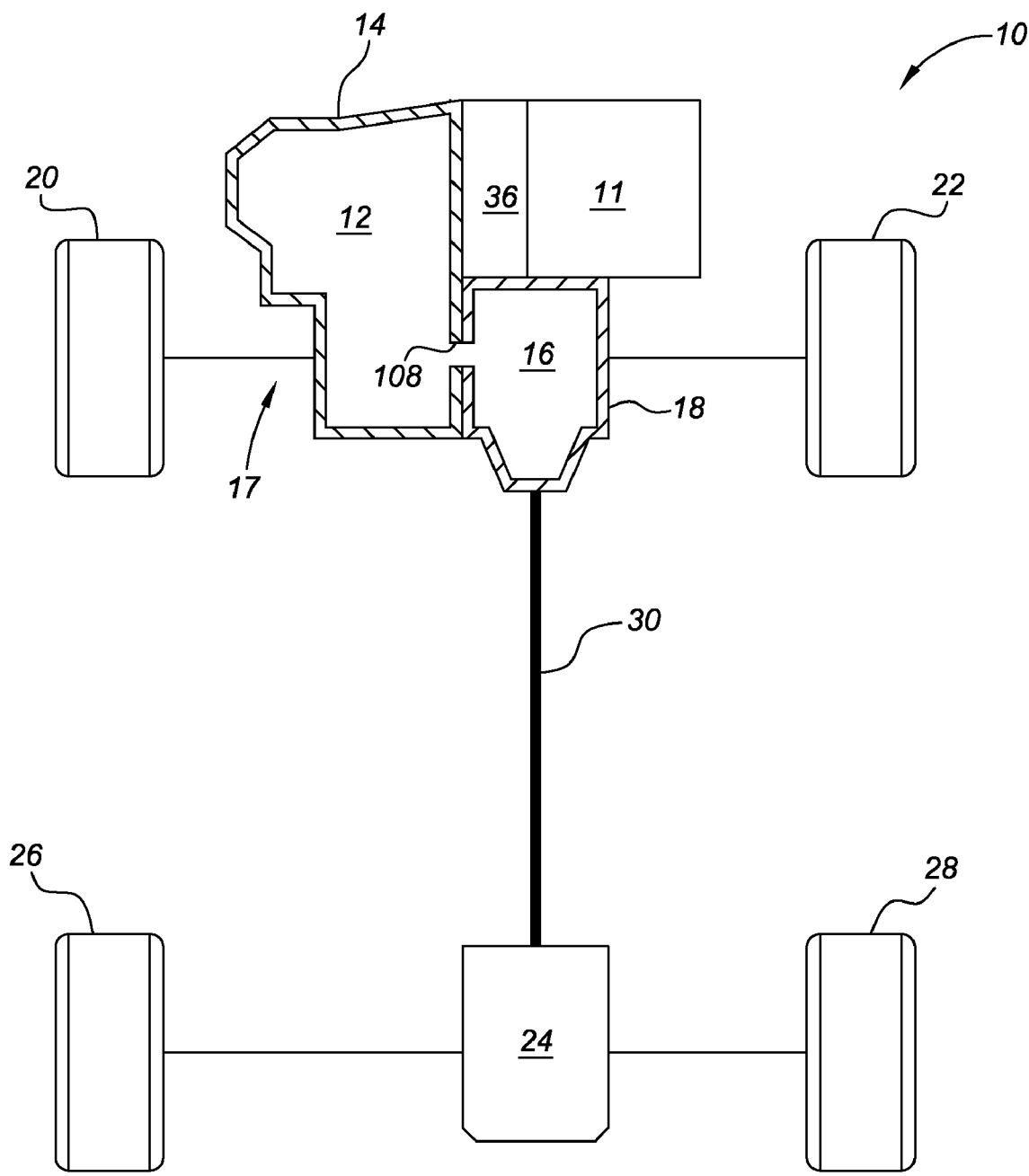
FIG. 1 is a schematic illustration of a vehicle having a torque distribution system with an electronic power take-off module including torque-transmitting mechanisms.

Referring to the drawings, wherein like reference numbers refer to like components, FIG. 1 shows a vehicle 10 powered by an engine 11. The engine 11 is operatively connected to a transmission 12, contained within a transmission casing 14, via a torque converter (shown in FIG. 2). An electronically-controlled power take-off module 16 has a module casing 18 connected to the transmission casing 14. Operation and control of the electronic power take-off module 16 is described with respect to FIG. 2. The power take-off module 16 is part of a torque distribution system 17 for transferring torque between the left and right front wheels, 20, 22 via a front differential mechanism (labeled 46 in FIG. 2) contained within the transmission casing 14, and between the front wheels 20, 22 and a rear differential mechanism 24 connected with rear wheels 26, 28 via a propeller shaft 30, also referred to herein as a longitudinally-extending member, used to connect the power take-off module 16 to the rear differential mechanism 24.

Figure 2:
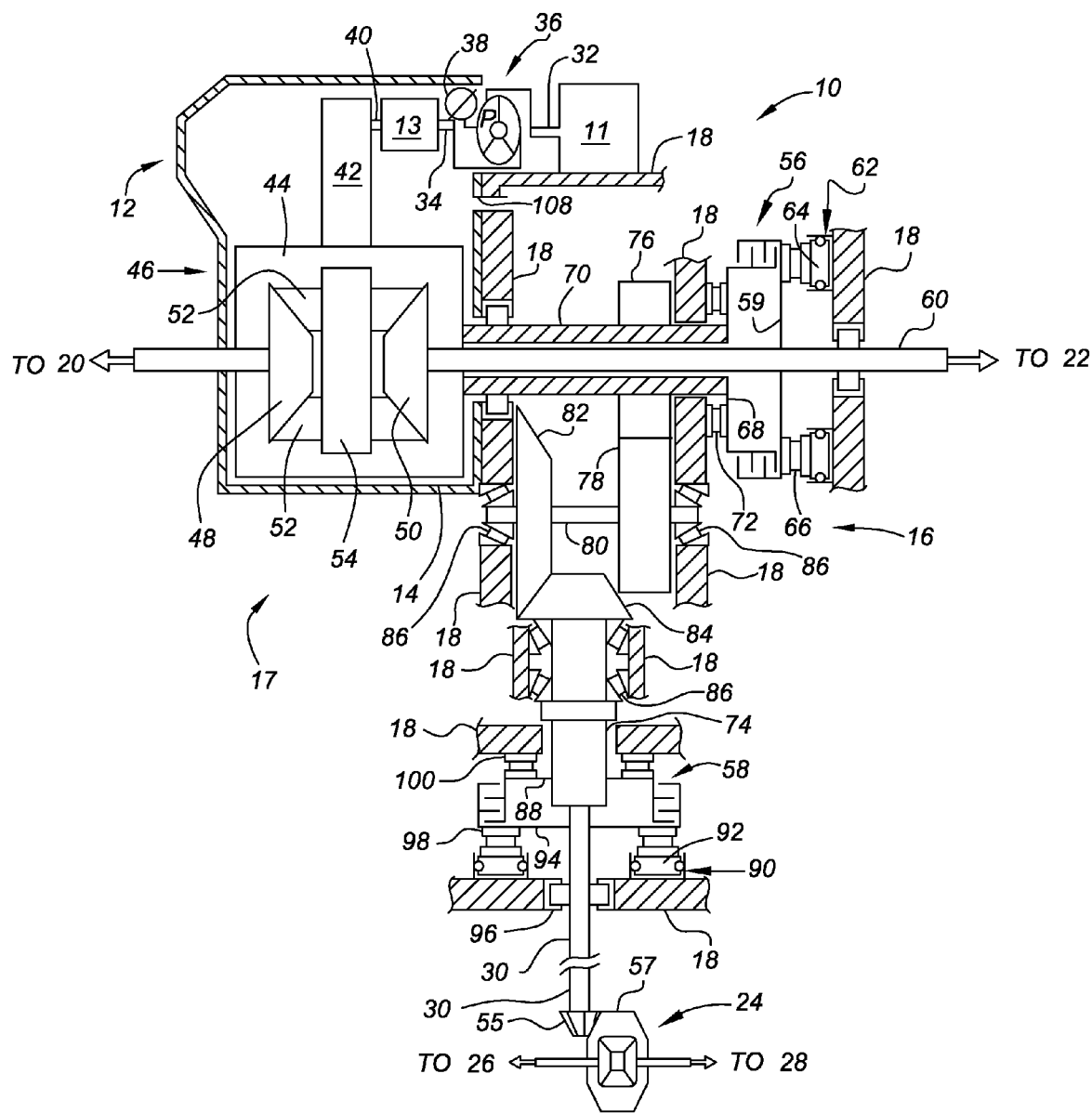
FIG. 2 is a schematic representation of the of the torque distribution system of FIG. 1 showing a hydraulic pump within the transmission and the torque-transmitting mechanisms within the electronic power take-off module.

Referring to FIG. 2, the engine 11 has an output shaft 32 connected to a transmission input member 34 via a torque converter 36. The engine 11 drives a pump portion P of the torque converter 36 to which a hydraulic pump 38 is connected. The hydraulic pump 38 provides hydraulic fluid for cooling a transmission gearing arrangement 13, including hydraulically-actuated gear selection friction clutches (not shown), located within the transmission casing 14 that are engagable to provide desired speed ratios between the transmission input member 34 and a transmission output member 40, as is understood by those skilled in the art. The output member 40 drives an output gear 42 meshingly engaged with a carrier member 44 of the front differential mechanism 46 (relative size of gear 42, carrier member 44, engine 11 and transmission 12 not to scale). The front differential mechanism 46 also includes a left side gear 48 and a right side gear 50 connected for respective rotation with the left and right wheels 20, 22. As is understood by those skilled in the art, pinion gears 52 mounted on a pinion shaft 54 meshingly engage with both of the side gears 48, 50 and permit the wheels 20, 22 to turn at different speeds during turning of the vehicle 10. A pinion gear 55 rotates with the propeller shaft 30 and meshingly engages with a carrier 57 of the rear differential 24.

The power take-off module 16 includes two torque-transmitting mechanisms in the form of friction clutches 56, 58, that, along with the hydraulic pump 38 and an electronic controller 110 (shown in FIGS. 3-5) form a transmission distribution system 17 that transfers torque between left and right front wheels 20, 22 and between front wheels 20, 22 and rear wheels 26, 28, as described hereinafter.

The friction clutch 56 is also referred to as an electronically-limited slip differential clutch. A hub 59 extends from a right wheel shaft 60 that rotates with the right side gear 50 and operatively connects to the right wheel 22. Hydraulic pressure supplied from the pump 38 to an apply cavity 62 moves a piston 64 which provides an axial force through a thrust bearing 66 to cause engagement of clutch plates splined to the hub 59 with clutch plates splined to a second hub 68 that is connected for rotation with a sleeve shaft 70 that rotates with the carrier 44. An additional thrust bearing 72 absorbs axial force between the hub 68 and a portion of the module casing 18 (shown in fragmented, cross-sectional view, but understood to be an integral casing as schematically depicted in FIG. 1). When the friction clutch 56 is released (i.e., not engaged), the front differential mechanism 46 functions as an open differential.

The friction clutch 58, also referred to as an active-on-demand clutch, is selectively engagable via hydraulic pressure provided by the hydraulic pump 38 to connect a longitudinal shaft 74 for common rotation with propeller shaft 30. The longitudinal shaft 74 is operatively connected to and driven by rotation of the sleeve shaft 70. Specifically, a set of intermeshing gears, including gear 76 mounted for rotation with sleeve shaft 70 and gear 78 mounted for rotation with intermediate shaft 80 transfers torque to a set of beveled gears including beveled gear 82 rotating with intermediate shaft 80 and beveled gear 84 rotating with longitudinal shaft 74, permitting a 90 degree shift in the axis of rotation between the sleeve shaft 70 and longitudinal shaft 74. Multiple angular thrust bearings 86 absorb loads between the gears 78, 82, 84, shafts 74 and 80 and the casing 18. When the friction clutch 58 is released (i.e., not engaged) no torque is sent to the rear differential mechanism 24.

A hub 88 extends from longitudinal shaft 74. Selective engagement of friction clutch 58 is via hydraulic pressure from the pump 38 supplied to fill cavity 90 to move piston 92 to engage friction plates extending from hub 88 with friction plates extending from a hub 94 connected for rotation with propeller shaft 30. A roller bearing 96 is placed between propeller shaft 30 and casing 18. Thrust bearings 98 and 100, transfer axial loading from the piston 92 to the friction plates and reaction loading from hub 88 to housing 18, respectively.

Figure 3:
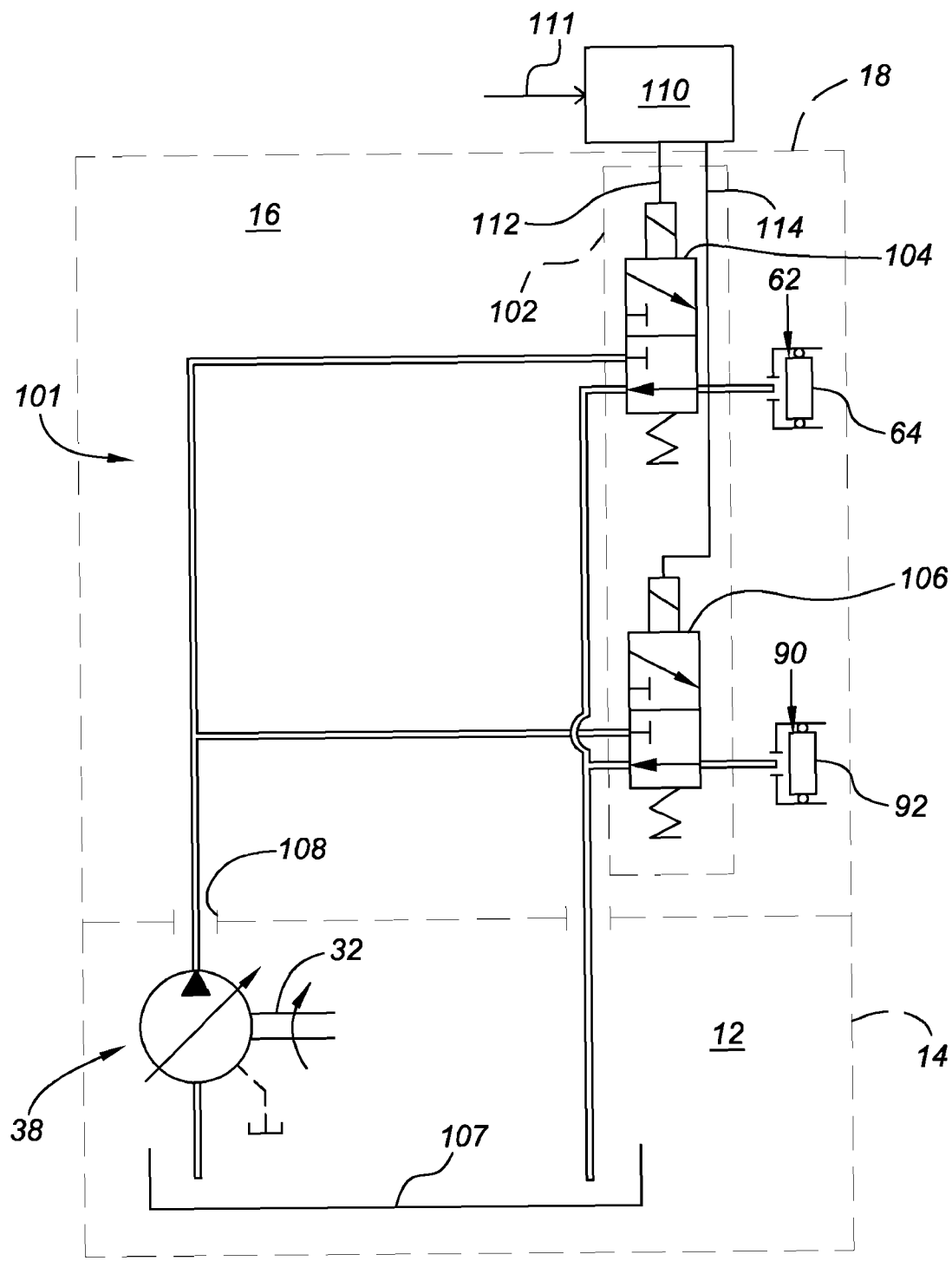
FIG. 3 is a schematic representation of a hydraulic control module for the torque-transmitting mechanisms of FIG. 2.

Referring to FIG. 3, hydraulic and electronic control of the electronically-limited slip differential clutch 56 and the active-on-demand friction clutch 58 of FIG. 2 is illustrated with respect to the respective clutch pistons 64 and 92. A hydraulic control module 101 includes a valve body 102 within the casing 18 of the power take-off unit 16. The valve body 102 houses electronically-controlled solenoid valves 104 and 106. The pump 38 pressurizes fluid drawn from a fluid source 107, such as a sump in the transmission casing 14, and is hydraulically connected with the solenoid valves 104 and 106 via a fluid passage extending through a passage opening 108 (also shown in FIGS. 1, 2, 4 and 5) formed by aligned apertures in the adjacent transmission casing 14 and module casing 18. (In FIGS. 3-5, the transmission casing 14 and the module casing 18 are depicted in phantom, and are only schematic, but represent the same casings 14, 18 depicted in FIGS. 1 and 2.) Other alternative means to hydraulically connect the pump 38 with the valve body 102 may be employed, such as an external tube. The controller 110 receives input information signals 111 from the vehicle 10, also referred to herein as sensor signals, which may include information from a yaw sensor, a steering wheel angle sensor, a lateral acceleration (G-force) sensor and wheel speed sensors. The controller 110 is shown external to casings 14 and 18, but may be an existing transmission controller housed in the transmission casing 14, a body module controller housed in a body of the vehicle 10, or a separate controller housed in the module casing 18. The input information signals 111 are processed by the controller 110 according to an algorithm stored therein to determine whether either or both of the friction clutches 56, 58 should be engaged to transfer torque, and the level of torque to be transferred and corresponding amount of hydraulic pressure that should be provided. The controller 110 provides control signals 112, 114 to move either or both of the respective solenoid valves 104, 106 an amount correlated to the amount of hydraulic pressure determined to be applied (movement is in a downward direction in FIG. 3), thereby allowing pressurized hydraulic fluid to reach fill cavity 62 and/or fill cavity 90 to engage the respective clutches 56, 58. Accordingly, the hydraulic control module 101 is electronically controlled by the controller 110 to vary the clutch capacity of the clutches 56, 58.

Figure 4:
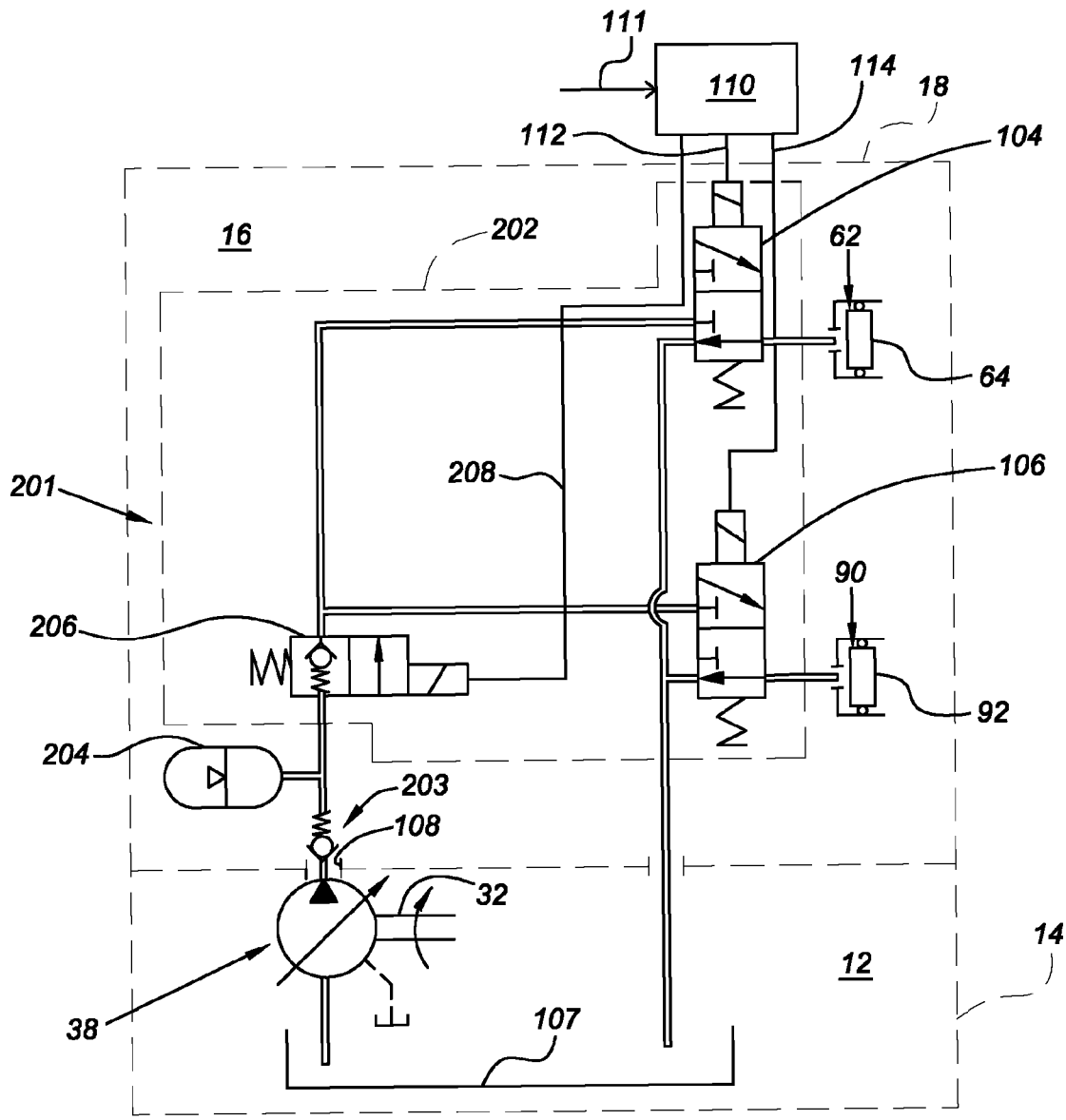
FIG. 4 is a schematic representation of an alternative hydraulic control module for the torque-transmitting mechanisms of FIG. 2.

Referring to FIG. 4, an alternative embodiment of a hydraulic control module 201 utilizes the same components as the hydraulic control module 101 of FIG. 3, and adds a ball check valve 203, an accumulator 204 and an additional solenoid valve 206. Solenoid valves 104, 106 and 206 are included in valve body 202. The ball check valve 203, accumulator 204 and additional solenoid valve 206 allow pressure to be stored in the hydraulic lines or passages shown connecting the pump 38 with the fluid apply chambers 62 and 90 of friction clutches 56, 58 of FIG. 2, thus reducing clutch apply time. The accumulator 204 stores pressurized fluid, as is known in the art. The ball check valve 203 is biased (e.g., spring loaded) to prevent backflow of the pressurized fluid to the sump 107 but is opened by a predetermined amount of fluid pressure delivered from the pump 38 sufficient to overcome the bias. The first additional solenoid 206 is in a closed position when unactuated, with a ball check valve therein preventing flow from the accumulator 204 to the solenoid valves 104, 106, thus maintaining stored pressure in the accumulator 204 and the hydraulic lines or passages. The first additional solenoid 206 receives a control signal 208 from the controller 110 actuating the solenoid 206 and causing it to open (by shifting to the left in FIG. 4) to permit flow therethrough.

Figure 5:
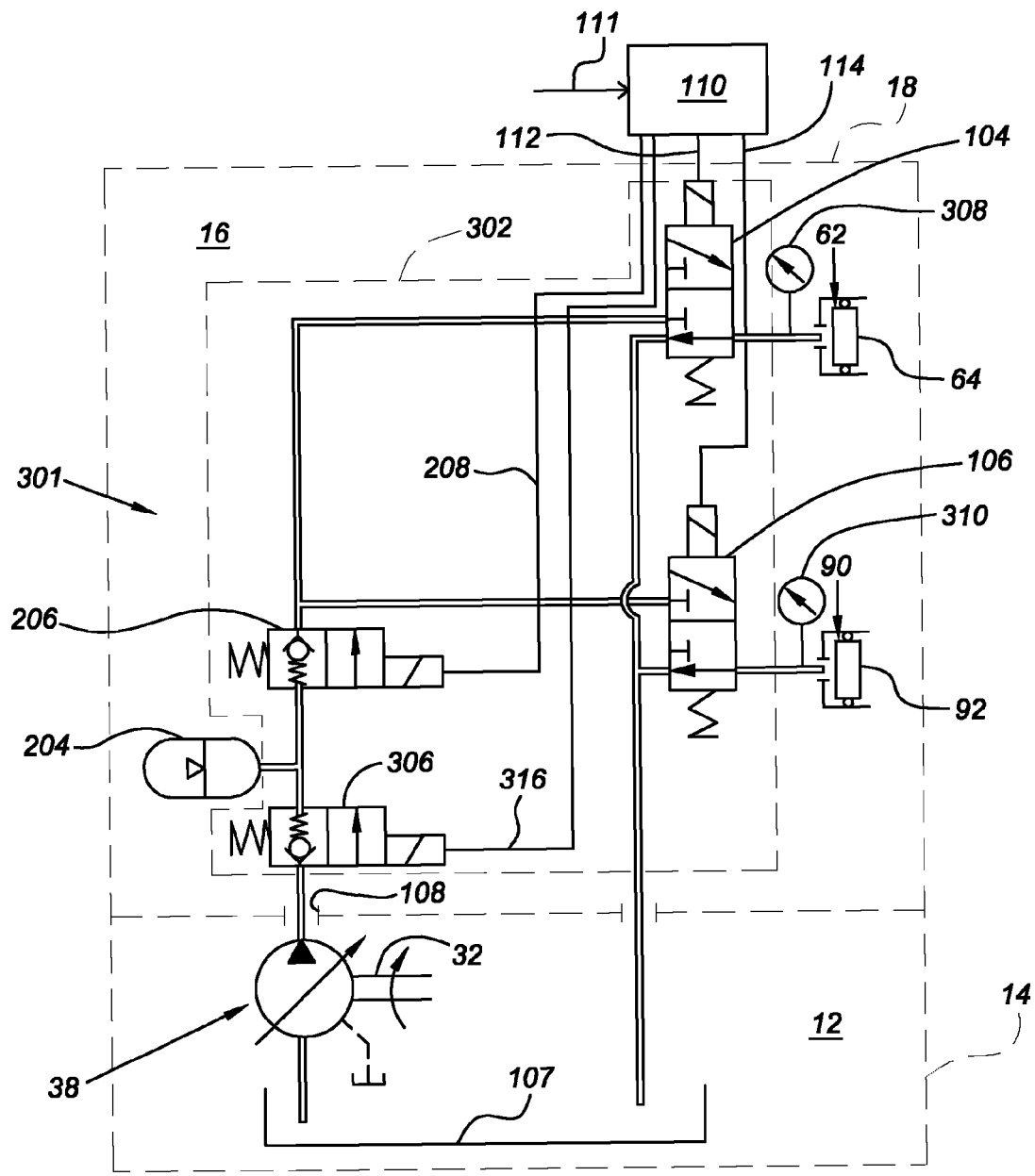
FIG. 5 is a schematic representation of another alternative hydraulic control module for the torque-transmitting mechanisms of FIG. 2.

Referring to FIG. 5, another alternative embodiment of a hydraulic control module 301 utilizes the same components as the hydraulic control module 201 of FIG. 4, except that the ball check valve 203 is replaced with a solenoid valve 306 that establishes, along with solenoid valves 104, 106 and 206, valve body 302. The solenoid valve 306 responds to a control signal 316 from the controller 110 to permit pumped, pressurized hydraulic fluid into the accumulator 204. The solenoid valve 306 allows more active control of when line pressure is stored than does the ball check valve 203 of FIG. 4. Also, two pressure sensors 308 and 310 are added to monitor the clutch pressure at the apply chambers 62, 90 of friction clutches 56, 58 of FIG. 2, respectively. The pressure sensors 308, 310 allow feedback clutch pressure control. Such pressure sensors may be employed in each of the hydraulic control module embodiments discussed herein.

Thus, referring again to FIG. 1, the friction clutches 56, 58 are controlled using hydraulic pressure from an engine-driven transmission pump 38 that is also used to provide pressure to transmission friction clutches (not shown, but housed within transmission casing 14, as is known in the art), and therefore allows torque distribution regardless of a difference in wheel speed. The electronically-controlled power take-off module 16 is relatively compact in size due to the absence of any additional pump or pump motor. The torque distribution system 16 permits torque distribution even when the vehicle wheels 20, 22, 26 and 28 are stationary, i.e., to assist with torque distribution at launch.

While the best modes for carrying out the invention have been described in detail, those familiar with the art to which this invention relates will recognize various alternative designs and embodiments for practicing the invention within the scope of the appended claims.

The invention claimed is:

1. A torque distribution system for a vehicle having an engine, wheels, and a hydraulic pump, comprising:
   at least one torque-transmitting mechanism selectively engagable to transfer torque between at least two of the wheels; wherein the hydraulic pump is hydraulically connectable with said at least one torque-transmitting mechanism for controlling engagement thereof;
   wherein the hydraulic pump is driven by the engine, thereby being operable to provide hydraulic pressure for engagement of said torque-transmitting mechanism even when the wheels are not rotating; and
   wherein the vehicle includes a transmission with an input member driven by the engine, an output member, and a transmission gearing arrangement to transfer torque from the input member to the output member; and wherein the hydraulic pump provides hydraulic pressure to the transmission.

2. The torque distribution system of claim 1, wherein the wheels include a left front wheel and a right front wheel, and further comprising:
   a first differential mechanism having a first member operatively connected for driving rotation by an output member of said transmission, a second member operatively connected for driving rotation of said left front wheel, and a third member operatively connected for driving rotation of said right front wheel; and
   wherein said at least one torque-transmitting mechanism includes a first friction clutch selectively engagable to transfer torque between said second member and said third member to thereby transfer torque between said left and right front wheels.

3. The torque distribution system of claim 1, wherein the wheels include left and right front wheels and rear wheels; and further comprising:
- a front differential mechanism operatively connected with said left and right front wheels, respectively;
- a longitudinally-extending member spanning at least partially between the front and rear wheels;
- a rear differential mechanism operatively connected with the rear wheels and with the longitudinally-extending member; and
- wherein the at least one torque-transmitting mechanism includes a first clutch selectively engagable for transferring torque between said front differential and said longitudinally-extending member to thereby transfer torque between the front and rear wheels.

4. The torque distribution system of claim 1, wherein the wheels include left and right front wheels; wherein said front differential mechanism has a carrier member driven by the transmission, left and right side gears driven by said carrier member and operatively connected for rotation with the left and right front wheels, and pinion gears meshing with both of the side gears; and
- wherein said at least one torque-transmitting mechanism includes a friction clutch selectively engagable for transferring torque between said left and right side gears of said front differential mechanism, thereby transferring torque between the left and right front wheels.

5. The torque distribution system of claim 1, further comprising:
- an electronic controller operative for receiving a sensor signal correlated with at least one vehicle condition and for sending a control signal based on said sensor signal and determinative of the hydraulic pressure applied to said at least one torque-transmitting mechanism, thereby permitting controlled slip of said at least one torque-transmitting mechanism to vary an amount of torque transferred by said at least one torque-transmitting mechanism.

6. The torque distribution system of claim 5, further comprising:
- a hydraulic control module operatively connecting said controller with said at least one torque-transmitting mechanism; wherein said hydraulic control module includes at least one solenoid selectively actuatable by a control signal from said controller to allow hydraulic pressure provided by said pump into fluid communication with said at least one torque-transmitting mechanism.

7. The torque distribution system of claim 6, wherein said at least one solenoid is a first solenoid, and further comprising:
- an accumulator;
- a check valve biased to prevent fluid communication of the hydraulic pump with the accumulator and openable upon a predetermined hydraulic pressure from the hydraulic pump to allow fluid communication of the hydraulic pump with the first solenoid; and
- an additional solenoid in fluid communication between the accumulator and the first solenoid and selectively actuatable and configured to permit hydraulic flow to said first solenoid when actuated and to prevent hydraulic flow to said first solenoid and maintain hydraulic pressure in the accumulator when not actuated.

8. The torque distribution system of claim 6, wherein said at least one solenoid is a first solenoid, and further comprising:
- an accumulator;
- a first additional solenoid in fluid communication between the accumulator and the first solenoid and selectively actuatable and configured to permit hydraulic flow to said first solenoid when actuated and to prevent hydraulic flow to said first solenoid and maintain hydraulic pressure in the accumulator when not actuated; and
- a second additional solenoid in fluid communication between the hydraulic pump and the accumulator and selectively actuatable and configured to permit fluid communication of the hydraulic pump with the accumulator when actuated and to prevent fluid communication of the hydraulic pump with the accumulator when not actuated.

9. The torque-distribution system of claim 6, further comprising:
- at least one pressure sensor operatively connected with said at least one torque-transmitting mechanism and operable to monitor apply pressure of said at least one torque-transmitting mechanism and communicate said monitored pressure to said controller.

10. The torque distribution system of claim 1, wherein engagement of said at least one torque-transmitting mechanism does not require braking of the vehicle.

11. The torque distribution system of claim 1, wherein said at least one torque-transmitting mechanism includes friction plates and a piston movable by said hydraulic pressure to engage said friction plates, and further comprising:
- thrust bearings axially adjacent said friction plates for transmitting axial force due to movement of said piston to engage said friction plates.

12. A torque distribution system for a vehicle having four wheels, including a left front wheel and a right front wheel, and an automatic transmission with a hydraulic pump, wherein the hydraulic pump provides hydraulic pressure to the transmission, comprising:
- at least one torque-transmitting mechanism selectively engagable to transfer torque between at least two of the wheels; wherein the hydraulic pump is hydraulically connectable with said at least one torque-transmitting mechanism for controlling engagement thereof;
- wherein the hydraulic pump is driven by the engine, thereby being operable to provide hydraulic pressure for engagement of said at least one torque-transmitting mechanism even when the wheels are not rotating;
- an electronic controller operative for receiving a sensor signal correlated with at least one vehicle condition and for sending a control signal based on said sensor signal and determinative of the hydraulic pressure applied to said at least one torque-transmitting mechanism, thereby permitting controlled slip of said at least one torque-transmitting mechanism to vary an amount of torque transferred by said at least one torque-transmitting mechanism;
- a hydraulic control module operatively connecting said controller with said at least one torque-transmitting mechanism; and wherein said hydraulic control module includes at least one solenoid selectively actuatable by a control signal from said controller to allow hydraulic pressure provided by said pump into fluid communication with said at least one torque-transmitting mechanism and configured to prevent fluid communication with said at least one torque-transmitting mechanism when not actuated.

13. A torque distribution system for a vehicle having four wheels, including a left front wheel, a right front wheel, and rear wheels, and having an automatic transmission with a hydraulic pump, wherein the hydraulic pump provides hydraulic pressure to the transmission, comprising:
- a first torque-transmitting mechanism selectively engagable to transfer torque between the left front wheel and the right front wheel;
- a second torque-transmitting mechanism selectively engagable to transfer torque between the front wheels and the rear wheels;
- wherein the hydraulic pump is hydraulically connectable with the first and the second torque-transmitting mechanism for controlling engagement thereof;
- wherein the hydraulic pump is driven by the engine, thereby being operable to provide hydraulic pressure for engagement of said at least one torque-transmitting mechanism even when the wheels are not rotating;
- an electronic controller operative for receiving sensor signals correlated with at least one vehicle condition and for sending control signals based on said sensor signals and determinative of the hydraulic pressure applied to the first and the second torque-transmitting mechanisms, thereby permitting controlled slip of the first and the second torque-transmitting mechanisms to vary an amount of torque transferred by the first and the second torque-transmitting mechanisms; and
- a hydraulic control module operatively connecting said controller with the first and the second torque-transmitting mechanisms and having
  - respective solenoids selectively actuatable by respective control signals from said controller to allow hydraulic pressure provided by said pump into fluid communication with said respective torque-transmitting mechanisms and configured to prevent fluid communication with said respective torque-transmitting mechanisms when not actuated;
  - an additional solenoid valve in fluid communication between the hydraulic pump and the respective solenoids;
  - an accumulator in fluid communication between the hydraulic pump and the additional solenoid; and
  - wherein the additional solenoid valve is selectively actuatable to allow fluid stored in the fluid accumulator into communication with the respective solenoids and is configured to prevent fluid communication with said respective solenoids when not actuated.

* * * * *